| 
US009500339B2

(12) United States Patent
Schmidt et al.

(10) Patent No.: US 9,500,339 B2
(45) Date of Patent: *Nov. 22, 2016

(54) METHOD AND A DEVICE FOR TESTING A LIGHTING DRIVING ASSISTANCE SYSTEM

(71) Applicant: Hella KGAA Hueck & Co., Lippstadt (DE)

(72) Inventors: Christian Schmidt, Paderborn (DE); Ingo Hoffmann, Berlin (DE)

(73) Assignee: Hella KGAA Hueck & Co., Lippstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,007

(22) Filed: Sep. 16, 2015

(65) Prior Publication Data

US 2016/0003439 A1    Jan. 7, 2016

Related U.S. Application Data

(63) Continuation of application No. 13/880,102, filed as application No. PCT/EP2011/005441 on Oct. 18, 2011, now Pat. No. 9,146,015.

(30) Foreign Application Priority Data

Oct. 18, 2010   (DE) .................. 10 2010 049 047

(51) Int. Cl.
*F21S 8/10* (2006.01)
*B60Q 1/08* (2006.01)
(Continued)

(52) U.S. Cl.
CPC .......... *F21S 48/1742* (2013.01); *B60Q 1/085* (2013.01); *G01M 11/065* (2013.01);
(Continued)

(58) Field of Classification Search
CPC .......... G01M 11/064; G01M 11/062; G01M 11/00; G01M 11/065; G01M 11/067; G01M 11/061; B60Q 1/00; B60Q 1/08; B60Q 1/085; B60Q 1/12; B60Q 1/16
USPC ................. 362/487, 37, 464, 460, 466, 465
See application file for complete search history.

(56) References Cited

U.S. PATENT DOCUMENTS 3,830,570 A    8/1974   Groetzner et al.
4,948,249 A    8/1990   Hopkins et al.
(Continued)

FOREIGN PATENT DOCUMENTS

DE    3826813    2/1990
DE    4122531    1/1993
(Continued)

OTHER PUBLICATIONS

U.S. Appl. No. 13/880,102, Non Final Office Action mailed Jan. 28, 2015, 7 pgs.
(Continued)

*Primary Examiner* — Donald Raleigh
*Assistant Examiner* — Kevin Quarterman
(74) *Attorney, Agent, or Firm* — Schwegman Lundberg & Woessner, P.A.

(57) ABSTRACT

The invention relates to a method and an apparatus for checking a lighting driving assistance system of vehicles. In this case, a vehicle is positioned in front of a body and a light of the vehicle is aimed at this body. Brightness distributions are obtained by adjusting the light in the horizontal and vertical directions in a plurality of angular positions and are recorded by an image capture unit. The recorded brightness distributions are used to calculate the distance and angular offset as well as the position of the body and actual values of the angular positions. These actual values are compared with preset desired values, and recommended settings for minimizing a difference between desired and actual values are output.

13 Claims, 4 Drawing Sheets

(51) Int. Cl.
*G01M 11/06* (2006.01)
*G01S 7/497* (2006.01)
*G01S 17/93* (2006.01)

(52) U.S. Cl.
CPC ......... *G01M 11/068* (2013.01); *G01S 7/4972* (2013.01); *B60Q 2200/38* (2013.01); *B60Q 2300/45* (2013.01); *G01S 17/936* (2013.01)

(56) References Cited

U.S. PATENT DOCUMENTS

| | | | |
|---|---|---|---|
| 4,973,155 A | 11/1990 | Masuda | |
| 5,164,785 A | 11/1992 | Hopkins et al. | |
| 5,193,894 A | 3/1993 | Lietar et al. | |
| 5,321,439 A | 6/1994 | Rogers | |
| 6,778,928 B2 | 8/2004 | Stiller | |
| 7,425,695 B2 | 9/2008 | Theiss et al. | |
| 8,310,662 B2 | 11/2012 | Mehr et al. | |
| 9,146,015 B2 * | 9/2015 | Schmidt | B60Q 1/085 |
| 2003/0031008 A1 | 2/2003 | Kobayashi | |
| 2007/0165416 A1 | 7/2007 | Ishida et al. | |
| 2013/0286670 A1 | 10/2013 | Schmidt et al. | |

FOREIGN PATENT DOCUMENTS

| | | |
|---|---|---|
| DE | 19932294 A1 | 1/2001 |
| DE | 19962997 A1 | 6/2001 |
| DE | 102004060474 A1 | 7/2006 |
| DE | 102008025458 A1 | 12/2009 |
| DE | 102008025459 A1 | 12/2009 |
| DE | 102008031159 A1 | 1/2010 |
| EP | 1316474 A2 | 6/2003 |
| EP | 2128590 A1 | 12/2009 |

OTHER PUBLICATIONS

U.S. Appl. No. 13/880,102, Notice of Allowance mailed Jul. 2, 2015, 8 pgs.
U.S. Appl. No. 13/880,102, Response filed Apr. 28, 2015 to Non Final Office Action mailed Jan. 28, 2015, 8 pgs.
"International Application No. PCT/EP2011/005441, International Preliminary Report on Patentability mailed May 2, 2013", 10 pgs.
"International Application No. PCT/EP2011/005441, International Search Report and Written Opinion mailed Feb. 7, 2012", 16 pgs.

* cited by examiner

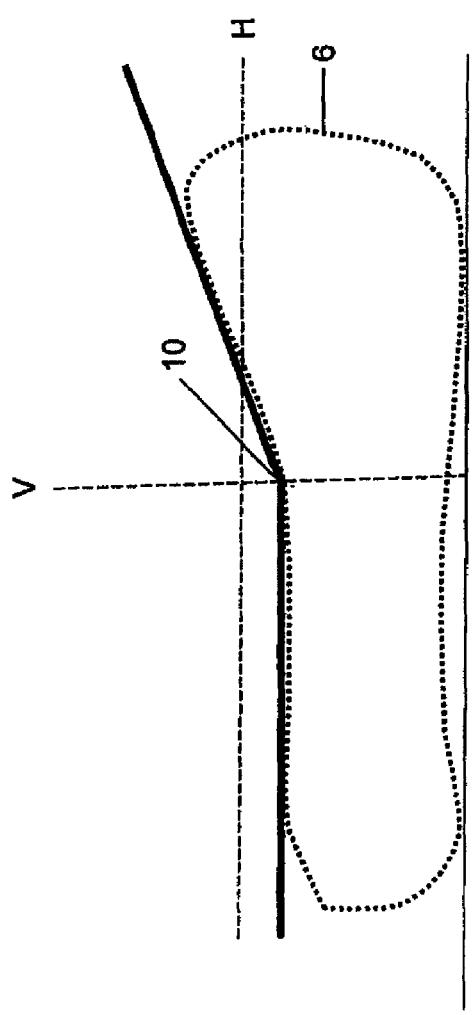

METHOD AND A DEVICE FOR TESTING A LIGHTING DRIVING ASSISTANCE SYSTEM

CLAIM OF PRIORITY

This application is a continuation application and claims the benefit of priority of U.S. patent application Ser. No. 13/880,102, filed Jun. 27, 2013, which is a national stage application under 35 U.S.C. §371 of PCT/EP2011/005441, filed Oct. 18, 2011, and published as WO 2012/052187 A1 on Apr. 26, 2012, which claims priority to German Application No. 10 2010 049 047.4, filed Oct. 18, 2010, which applications and publication are incorporated by reference as if reproduced herein and made a part hereof in their entirety, and the benefit of priority of each of which is claimed herein.

TECHNICAL FIELD

The invention relates to a method and to a device for testing a lighting driving assistance system of vehicles.

BACKGROUND

For reasons of traffic safety, vehicles comprise illumination devices such as headlights for example. For some years now, lighting driving assistance systems, e.g. dynamic bending light, have been applied in vehicles for the optimal illumination of the driven regions. These driving assistance systems on the one hand are to permit a maximal possible illumination of the driven region for aiding the driver, but on the other hand are also to prevent other road users from being unallowably glared. These concerns are met by modern systems such as AFS (advanced frontlighting system) in motor vehicles, with which headlight light not only follows the course of the road, but also illuminates the driven regions in dependence on the speed.

For this, pictures of the driven region are taken by a camera, are evaluated via a picture processing and the illumination device is tracked accordingly. However, neither do modern systems operate completely without errors, so that impairments to other road users, for example due to dazzling, occur due to incorrectly made settings of the driving assistance system.

For this reason, methods for the calibration of driving assistance systems are known from the state of the art. Thus DE 10 2008 025 459 A1 discloses a method for calibrating a vertical light-dark boundary. The disadvantage with the known methods is the fact that the testing of the correct manner of functioning of the driving assistance system as a rule is only possible by expert and experienced personnel, and that a final testing of the cooperation of the camera and headlight is subsequently only possible with a travel at night.

SUMMARY

It is therefore the object of the invention, to provide a method and a device which, within the framework of standardised service activities, permits the general function of driving assistance systems to be checked and any setting errors to be determined.

According to the invention, this object is achieved by a method with the features of the main claim, as well as by a device with the features of the auxiliary claim. Advantageous further developments are described in the dependent claims.

A method according to the invention envisages a vehicle with at least one lamp and at least one picture acquisition unit being positioned in front of a body with a preferably plane surface, wherein the light departing from the lamp is incident onto the body. With regard to the lamp, it is typically the case of a headlight. Then, the pivot region of the lamp is passed through, by way of the lamp being pivoted by a defined angle into several angular positions. This can be effected in the horizontal and/or vertical direction. A multitude of recorded values can hereby serve for the plausibilisation of the method and for the testing by way of as many as possible measurement readings. With regard to the lamp, it can particularly be the case of a front headlight which is set to low beam (dipped beam) or, inasmuch as is present, glare-free high beam (full beam). A picture of the brightness distribution obtained on the surface of the body in each newly set angular position is recorded by the picture acquisition unit.

Characteristic points of the brightness distribution, e.g. the position of a break point or of the rise of the vertical light-dark boundary can be determined from the obtained brightness distributions by way of picture processing. The break point thereby is defined as the intersection point between a cut-off line and an oblique borderline of a light distribution, in particular of low beam light distribution. Hereby, a first functional testing of the system which is not specified in more detail, in particular of the picture acquisition unit and the pivoting of the lamps, can already be effected. Thereby, one can check as to whether after each recording, the break point or the rise in brightness at the light-dark boundary is found at different picture coordinates, and an error is present if this is not the case.

A possibly present angular offset with the positioning between the lamp and the body as well as the distance between both objects is computed from the obtained brightness distributions and the readings, by way of a trigonometric method. Thus the position of the body in a coordinate system of the vehicle is determined. For this, one can also use a different vehicle coordinate system, e.g. a three-dimensional, right-handed coordinate system. A conversion of the coordinates can thereby be effected whilst utilising the already determined angle and distance between the two bodies.

In the next step of the method, at least one actual value of at least one angular position is computed from an obtained brightness distribution and this actual value unambiguously indicates the angular position of the lamp at the respective control command. In the last step, corrective values are issued for minimising a difference between the desired value and the actual value, wherein the desired values for certain angular positions, for example an orthogonal incidence of light on the body, are already preset in dependence on the distance and angular offset, and stored. A beaming of the lamps which is orthogonally incident on the surface is characterised in the brightness distribution by way of the width or the height of the obtained brightness distribution being minimal.

This method permits the functioning manner of a lighting driving assistance system to be tested in a simple way and manner. What is particularly advantageous with this is the fact that the method can be applied without any special prior training of the operating personnel, in a workshop environment, and expensive testing, for example within the scope of a night journey, is no longer necessary. In particular, the method automatically determines the angular offset and the distance to the body, so that the operating personnel who are concerned with the implementation of the method do not need to pay separate attention to these points.

For computing the actual value of the pivot angle, preferably a location of a characteristic point of the brightness distribution is determined for this angular position, and the actual value is computed from the thus determined location, the determined distance and the determined angular offset. The characteristic point can hereby be a break point or the rise of the vertical light-dark boundary. The location of the characteristic point can be defined by picture coordinates of the acquired brightness distribution.

If the vehicle comprises more than one lamp, then this further lamp, inasmuch as this is technically possible, can preferably be set to the smallest possible light distribution and be moved into the outermost or lowermost position, so that the emitted light is not incident on the body. This lamp can alternatively also be covered over.

In an advantageous manner, the vehicle when carrying out the method can be positioned with its longitudinal axis orthogonal to the body at a distance of between 6 m and 12 m between the lamp and the surface, wherein at least one beaming direction of the lamp is incident onto the body. This on the one hand permits the computational effort for computing an angular offset to be saved and on the other hand however also permits brightness distributions of a sufficient quality to be obtained, since with a smaller distance, the brightness distribution on the surface is possible represented in too small a manner, so that a correct acquisition by the picture acquisition unit can no longer be guaranteed, whereas it becomes blurred with a greater distance and possibly can likewise be no longer correctly acquired.

The pivoting of the lamp in the horizontal and vertical direction is effected in an advantageous manner in two directions of each axis: starting from a first extreme value of the pivoting on the respective axis, the lamp is adjusted up to a second extreme value, and the adjustment is subsequently effected in the reverse direction. This procedure serves for determining a possibly present tolerance play and for taking in it into account when issuing the corrective values.

In a particularly advantageous manner, a predefined system tolerance, for example an angular error due to installation and which is generally smaller than 2°, can be taken into account in a manner such that a correction is carried out if and only if the difference between the desired value and the actual value exceeds a system tolerance with regard to magnitude. Thus it is ensured that a certain system tolerance which cannot be completely avoided on installation of the light system is accordingly taken into account, and even with lamps which are not installed in an exact manner, permits an error-free setting by the method.

Further functions of the lighting system can be tested in a defined angular position, after the minimisation of the difference between the desired values and actual values has been effected. For this, the high beam and low beam are preferably tested with regard to the correct functioning. This permits the complete function of the lamp to be tested with regard to its functionality.

In a particularly advantageous manner, the difference between the desired values and the actual values of the angular positions is automatically corrected. Thus again, one can make do without a setting by hand, which is prone to error.

In a particularly advantageous manner, the method is applied for testing further lamps of the vehicle. Hereby, the same steps which were applied for testing the first lamp are also carried out for testing at least one further lamp. The correct functioning manner of the method can also be determined from the data obtained therefrom, since with all runs, the computed position data of the body must agree, otherwise the method operates in an incorrect manner.

A device for carrying out the described method, apart from at least one lamp, comprises a picture acquisition unit, an evaluation unit and an issuing unit. One can also provide more than one picture acquisition unit for detecting stereo-pictures. The picture acquisition unit thereby records the brightness distributions which are produced on a body by the lamp in different angular positions, leads these to an evaluation unit, wherein the evaluation unit by way of a picture processing computes actual values of the angular position and corrective values, and leads these corrective values as a setting recommendation to the issuing unit. The issuing unit finally issues these setting recommendations for minimising a difference between preset desired values and actual values.

It is advantageous if the body is a wall with a preferably plane surface and has a high albedo, for example by way of a white colouring. It is thus ensured that a clearly recognisable brightness distribution on the body can be captured by the picture acquisition unit, without too much brightness being absorbed.

It is further advantageous to carry out the setting of the vertical angular positions by way of a headlamp levelling which as a rule is already present in a vehicle. Preferably, at least three, particularly preferably six different values of the headlamp levelling are set and examined. Thus the correct function of an actuator used for the headlamp levelling can be checked.

BRIEF DESCRIPTION OF THE DRAWINGS

Embodiment examples of the invention are represented in the drawings and are hereinafter explained by way of FIGS. 1 to 4. There are shown in.

DETAILED DESCRIPTION

Figure 1:
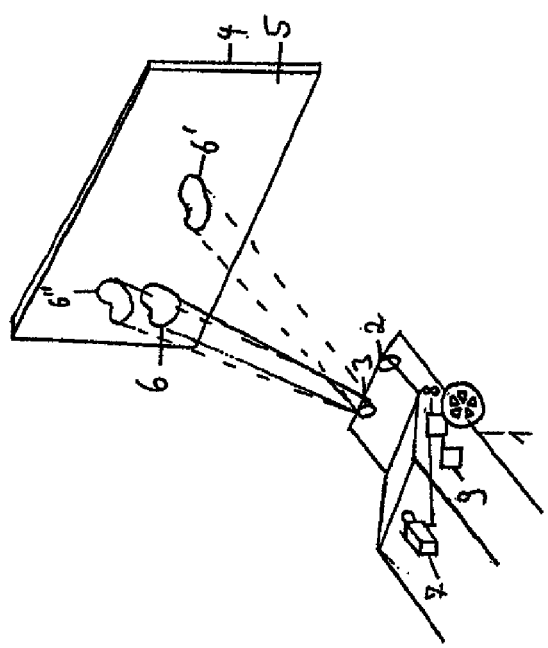
FIG. 1 a schematic representation of the production of brightness distributions on a body, FIG. 2 a procedural schematic diagram, of a method according to the invention, FIG. 3 a schematic representation of a method for determining a distance between the lamp and the body and FIG. 4 a schematic representation of a brightness distribution with a characteristic break point.

FIG. 1 schematically represents the production of brightness distributions on a body by a lamp of a vehicle. A vehicle 1, in this case an automobile, comprises a lighting driving assistance system and has two front headlights 2, 3 as lamps, of which one headlight, in the represented case the right headlight 2, is switched off or is covered. The left headlight 3 is set to low beam and beams a brightness distribution 6 onto a whitely painted wall 4 with a plane surface 5. The brightness distribution 6 is thereby asymmetrical, and one side is illuminated to a greater extent depending on the traffic direction, i.e. with vehicles which are to be in right-hand traffic, it is the right side which is illuminated to a greater extent, and it is the left one with left-hand traffic. The wall 4 can thereby be a wall of a building, but also a movable erected wall. Instead of this however, a gate, for example a workshop door can also be used.

The distance between the vehicle and the wall is 8 m in this case, and the longitudinal axis of the vehicle which is perpendicular to the front axle has a right angle to the wall, so that the front axle of the vehicle is set parallel to the wall. A picture acquisition unit 7 is contained in the vehicle and here is a camera behind the windscreen, said camera recording the brightness distribution 6 produced on the wall 4 by the headlight 3, and the actual values of the angular positions are computed via an evaluation unit 8 connected to the picture acquisition unit 7. In the present case, the evaluation unit 8 is a computer which is either fixedly assembled in the vehicle or for example can be located in a workshop and moved to different vehicles and connected. Although the picture processing thereby is able to have picture errors depending on the applied lens, the lighting means of the lamp or other factors, the evaluation of the angular position however is sufficiently accurate, since these systematic errors occur with all pictures recorded by the respective system and can thus be taken into account on picture processing.

The picture processing can determine the position of a break point 10 as a characteristic point, from the brightness distribution 6, alternatively also a rise of the vertical light-dark boundary, and thus can unambiguously characterise the brightness distribution 6 by way of the position of the break point 10 or of the rise. The break point 10, as represented in FIG. 4, is an integral part of a low beam light distribution and is defined by the intersection point of a horizontally running cut-off line with an obliquely running borderline. The break point 10 is located at between 0.5° and 0.6°, preferably 0.57° below the optical axis. The break point 10 can be easily recognised in FIG. 4, which shows the brightness distribution 6 on the wall 4.

The evaluation unit computes corrective values and sends these to an issuing unit 9 which issues the corrective values for minimising a difference between preset desired values and computed actual values. The desired values thereby are already contained in a memory of the evaluation unit 8, and the issuing unit 9 consists of a screen incorporated in the vehicle, for example of the navigation apparatus, or of a screen located outside the vehicle. The corrective values are thereby issued for example as a number of revolutions at a setting screw of the headlight 3 which is not shown here. On issuing the corrective values, a predefined system tolerance was already taken into account by the evaluation unit 8 and this system tolerance was added as a safety variable to the corrective values issued as setting values.

In an advantageous further development, which however is not shown here, the corrective values were not only issued as setting recommendations, but also already automatically corrected by way of a motor.

As soon as the correction of the actual values is completed and these agree with the desired values, further functions of the lighting system such as the error-free functioning of the high beam light and low beam light are checked. For this, the headlight is moved into a 0° position, i.e. the produced light is perpendicularly incident onto the wall.

Figure 2:
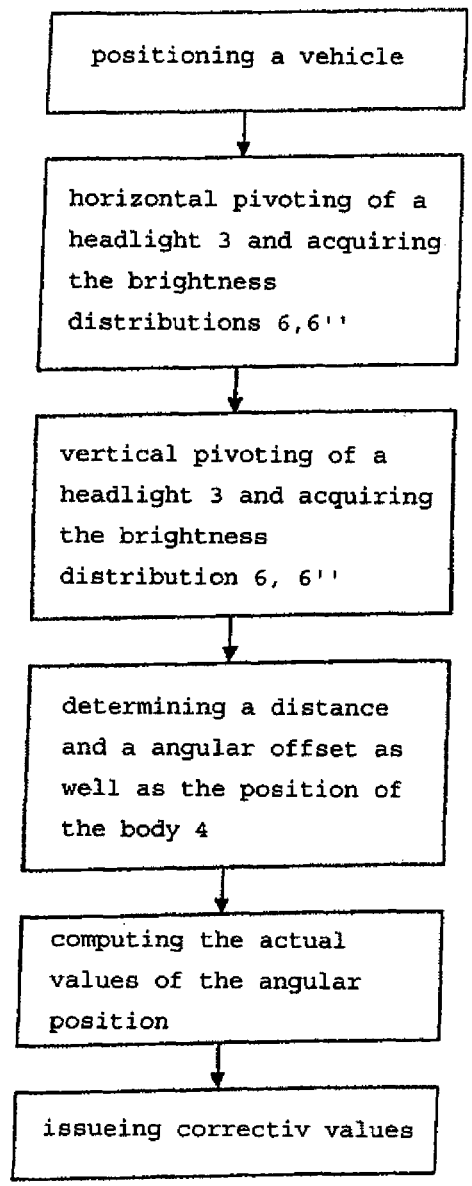

A schematic procedural plan of the method is represented in FIG. 2 and represents the steps in the respective temporal sequence and which are to be carried out with the described device for carrying out the method according to the invention. Firstly, the headlight 3 is pivoted in the horizontal direction and one obtains at least one brightness distribution 6'. Hereby, one starts from the left abutment point and the adjustment is effected in steps of 1° up to the right abutment point. The angular region of the horizontal adjustment in the present case is +15° or −7°, which as a whole corresponds to 23 different brightness distributions. As a rule, the angular regions are distributed asymmetrically about the 0° position, since a limitation of the pivoting is effected by the vehicle body in one direction. Subsequently, the same angular positions are run through in the reverse direction. A tolerance play is determined in this manner.

After the horizontal pivoting, the headlight 3 is moved back into the starting position and is adjusted vertically, wherein this adjustment in the represented case is carried out by a suitable setting of the headlight levelling. By way of this, one obtains at least one further brightness distribution 6". At least three brightness distributions are recorded with the vertical as well as horizontal adjustment of the headlight 3. The method can already be carried out with three obtained measurement readings, but for an examination of the plausibility, at least six brightness distributions should however be recorded. Thus the data basis is widened and the accuracy of the method is increased by way of more measurement readings. With this, one can also test as to whether the actuator of the headlight levelling functions in a correct manner.

Now the distance and a possible angular offset between the headlight 3 and a plane surface 5 are computed by way of trigonometric methods, and moreover the position of the wall 4 in the coordinate system of the vehicle 1 is determined.

Actual values of the pivot angle are computed from the location of a characteristic point of the brightness distribution for the respective angular position, from the determined distance and from the determined angular offset. The location of the characteristic point is defined by the picture coordinates of the brightness distribution 6, 6', 6" which is acquired by the picture acquisition unit 7.

The actual values of the angular positions of the headlight 3 which are determined from the brightness distributions 6, 6', 6" are compared to set desired values. In the last step of the method, finally corrective values are formed between actual values and desired values, and these corrective values should minimise the difference between these two values.

As soon as the method for the headlight 3 is completed, this is switched off or is covered and the same steps are carried out for the second lamp 2. Thereby, one also tests as to whether the method functions correctly, since only then do the computed positions of the body agree, given brightness distributions produced by different headlights.

It is thus ensured by way of the method, that the headlight 3 is functionally capable and has been correctly set. Moreover, one ensures that the data transfer between the camera and the headlight functions.

Figure 3:
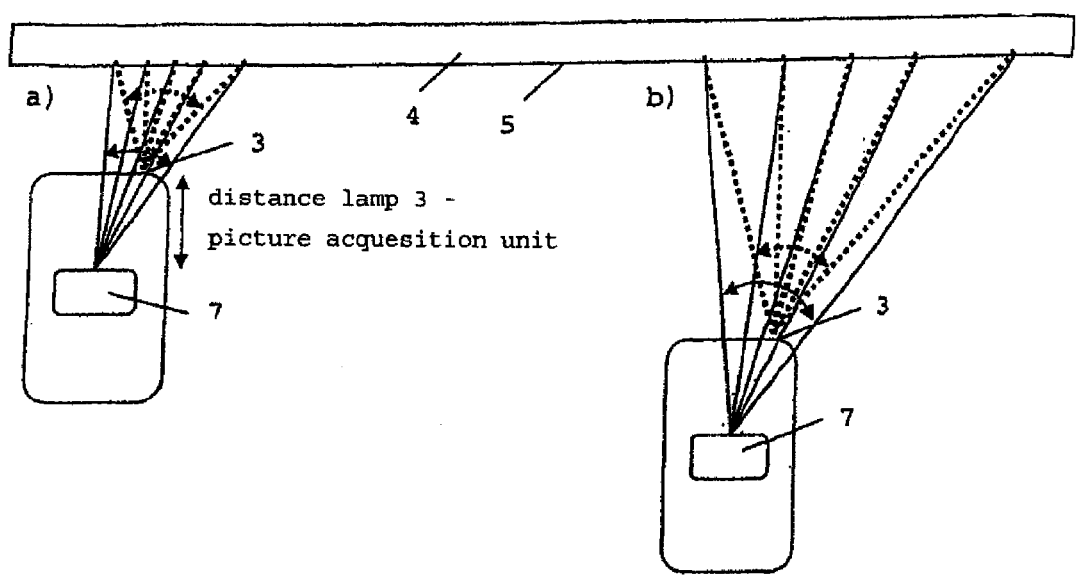

FIG. 3 schematically represents how a method for determining the distance between headlights 3 and a plane surface 5 functions. For this, the pivot region of the headlight 3 is represented for two different distances of the vehicle to the wall. The pivot region is represented in FIG. 3 by dashed lines. The vehicle in FIG. 3*a*) is closer to the plane surface 5 of the wall 4 than in FIG. 3*b*). The angle, about which one pivots is however identical in both cases. Moreover, the distance between the headlight 3 and the picture acquisition unit 7 is known and constant. The picture acquisition unit 7, here again a camera, now acquires the pivot region of the headlight by way of the brightness distributions 6, 6', 6" produced on the plane surface 5. This acquisition region is represented by unbroken lines. The width of the region acquired by the picture acquisition unit 7 is then dependent on the position difference between the headlight 3 and the picture acquisition unit 7, as well as on the distance between the headlight 3 and the plane surface 5. The pivot angles of the headlight 3 and the distance-dependent width of the brightness distributions 6, 6', 6" detected by the picture acquisition unit 7 are equally large at a larger distance between the headlight 3 and the plane surface 5, i.e. if this distance is significantly larger than the distance between the headlight 3 and the picture acquisition unit 7. With a lower distance (again with respect to the distance between the headlight 3 and the picture acquisition unit 7) the width observed by the picture acquisition unit 7 reduces until it can only be detected as a point, when the distance between the headlight 3 and the plane surface 5 and the distance between the head light 3 and the picture acquisition unit 7 are equally large.

Thus from the observed width and the known distance between the headlight 3 and the picture acquisition unit 7, as well as from the likewise known pivot angle of the lamp, one can trigonometrically compute the distance between the plane surface 5 and the headlight 3. Moreover, a possibly present angular offset between the vehicle axis and the wall can be determined.

FIG. 4 represents a brightness distribution 6 which runs asymmetrically, since the headlight 3 producing the brightness distribution 6 is designed for right-hand traffic and in particular is to illuminate the edge of the road. The brightness distribution 6 has a break point 10 at the transition of a horizontal to an obliquely running borderline. This break point can be detected for each brightness distribution via the picture acquisition unit 7, wherein the location of the break point 10 is expressed by picture coordinates. The location of the break point 10 is a characteristic feature of each brightness distribution.

What is claimed is:

1. A method for testing a lighting driving assistance system of a vehicle with at least one lamp and at least one picture acquisition unit, comprising the following steps:
   positioning the vehicle in front of a body in a manner such that at least one beaming direction of the lamp is aimed onto the body;
   determining a distance and an angular offset between the vehicle and the body
   computing at least one actual value of a pivot angle of the lamp; and
   issuing at least one corrective value for minimizing a difference between a preset desired value and the computed actual value of the pivot angle of the lamp.

2. The method of claim 1, comprising acquiring a brightness distribution at at least two different angular positions of the lamp.

3. The method of claim 2, wherein for computing the actual value of the pivot angle, a location of a characteristic point of the brightness distribution is determined for the corresponding angular position, and the actual value is computed from the thus determined location, from the determined distance and from the determined angular offset.

4. The method according to claim 1, wherein the vehicle with its longitudinal axis is positioned orthogonally to the body, so that a beaming direction of the lamp is orthogonal on a plane surface of the body.

5. The method according to claim 1, wherein the horizontal and vertical setting of the pivot angle of the lamp, departing from a first extreme value of a pivoting about a respective axis is effected in one direction up to a second extreme value, and subsequently departing from the second extreme value, the setting of the positions is effected in the opposite direction up to the first extreme value, in order to determine a tolerance play.

6. The method according to claim 1, wherein a correction is carried out only when a difference between the desired value and actual value, with regard to magnitude, exceeds a system tolerance.

7. The method according to claim 1, wherein further functions, including high beam and low beam, are tested in a fixed angular position, after the minimization of the difference between the desired values and actual values.

8. The method according to claim 1, wherein the difference between the desired value and actual value of the pivot angle of the lamp is automatically corrected.

9. The method according to claim 1, wherein the correct functioning manner of the method is tested by way of testing a further lamp and the comparison of the computed position of the body on the basis of corresponding brightness distributions is determined hereby.

10. The method according to claim 1, wherein the vehicle with its longitudinal axis is positioned orthogonally to the body, so that the beaming direction of the lamp is orthogonal on a plane surface of the body with a distance of between 6 in and 12 m between the lamp and the plane surface.

11. A device for testing a lighting driving assistance system of a vehicle with at least one lamp, the device comprising at least one picture acquisition unit, an evaluation unit and an issuing unit, wherein the at least one picture acquisition unit is configured to acquire a brightness distribution produced on a surface of a body by the at least one lamp in different angular positions, wherein at least one actual value of the pivot angle of the lamp is computed via the evaluation unit, and wherein the issuing unit is configured to provide a setting recommendation for minimizing a difference between a preset desired value and the computed actual value of the pivot angle of the lamp.

12. The device according to claim 11, wherein the body includes a plane surface of the body that is formed by a wall and has a high albedo.

13. The device according to claim 11, wherein the pivot angles of the lamp include vertical pivot angles of the lamp capable of being set via a headlight levelling.

* * * * *